United States Patent
Sauter et al.

(10) Patent No.: US 11,793,312 B2
(45) Date of Patent: Oct. 24, 2023

(54) ELECTROMOTOR ADJUSTING UNIT FOR ADJUSTING THE INCLINATION OF A SUPPORT PART OF AN ITEM OF SEATING FURNITURE

(71) Applicant: HETTICH FRANKE GMBH & CO. KG, Balingen-Weilstetten (DE)

(72) Inventors: Benjamin Sauter, Albstadt (DE); Marcel Schlaich, Geislingen (DE)

(73) Assignee: HETTICH FRANKE GMBH & CO. KG, Balingen-Weilstetten (DE)

( * ) Notice: Subject to any disclaimer, the term of this patent is extended or adjusted under 35 U.S.C. 154(b) by 42 days.

(21) Appl. No.: 17/612,297

(22) PCT Filed: May 7, 2020

(86) PCT No.: PCT/EP2020/062736
§ 371 (c)(1),
(2) Date: Nov. 18, 2021

(87) PCT Pub. No.: WO2020/234000
PCT Pub. Date: Nov. 26, 2020

(65) Prior Publication Data
US 2022/0312976 A1    Oct. 6, 2022

(30) Foreign Application Priority Data
May 20, 2019   (DE) ..................... 10 2019 113 391.2

(51) Int. Cl.
*B60N 2/80*    (2018.01)
*A47C 7/38*    (2006.01)
(Continued)

(52) U.S. Cl.
CPC ................ *A47C 7/38* (2013.01); *A47C 1/036* (2013.01); *B60N 2/853* (2018.02); *B60N 2/856* (2018.02); *B60N 2/859* (2018.02)

(58) Field of Classification Search
CPC .......... A47C 7/38; A47C 1/036; B60N 2/853; B60N 2/856; B60N 2/859
See application file for complete search history.

(56) References Cited

U.S. PATENT DOCUMENTS

| | | | |
|---|---|---|---|
| 6,471,296 B2 | 10/2002 | Lance | |
| 7,648,200 B2 * | 1/2010 | Oda | ...................... B60N 2/0232 297/216.12 |

(Continued)

FOREIGN PATENT DOCUMENTS

| | | |
|---|---|---|
| DE | 19983415 B4 | 9/2001 |
| DE | 102012101846 A1 | 9/2013 |

(Continued)

OTHER PUBLICATIONS

International Search Report dated Jun. 15, 2020 in related/corresponding International Application No. PCT/EP2020/062736.
(Continued)

*Primary Examiner* — Syed A Islam
(74) *Attorney, Agent, or Firm* — PATENT PORTFOLIO BUILDERS PLLC (57) ABSTRACT

An electromotive adjusting device for adjusting the inclination of a seat part of an item of seating furniture includes a mounting bracket for connecting to a body element of the item of seating furniture and a motor and transmission unit embodied as a drive unit. A mounting element secures the seat part of the item of seating furniture. The motor and transmission unit includes a rotatable drive element and is securely fixed to the at least one mounting bracket.

15 Claims, 13 Drawing Sheets

(51) Int. Cl.
    *A47C 1/036*     (2006.01)
    *B60N 2/853*    (2018.01)
    *B60N 2/856*    (2018.01)
    *B60N 2/859*    (2018.01)

(56)          References Cited

U.S. PATENT DOCUMENTS 8,657,379 B2    2/2014  Humer et al.
    8,820,832 B2*   9/2014  Dumont ................. B60N 2/879
                                                          297/217.3

FOREIGN PATENT DOCUMENTS

DE      102013210226 A1    3/2014
    DE      102013200328 A1    7/2014
    KR       20030060284 A     7/2003
    WO       2011037368 A2     3/2011

OTHER PUBLICATIONS

Search Report created Jan. 13, 2020 in related/corresponding DE Application No. 10 2019 113 391.2.
Written Opinion dated Jun. 15, 2020 in related/corresponding International Application No. PCT/EP2020/062736.

* cited by examiner

ELECTROMOTOR ADJUSTING UNIT FOR ADJUSTING THE INCLINATION OF A SUPPORT PART OF AN ITEM OF SEATING FURNITURE

BACKGROUND AND SUMMARY OF THE INVENTION

Exemplary embodiments of the invention relate to an electromotive adjusting unit for adjusting the inclination of a support part of an item of seating furniture, as well as to an item of seating furniture and a support part of an item of seating furniture.

Seating furniture, in particular upholstered armchairs or parts of an upholstered sofa, can have support parts that are adjustable in inclination. Headrests or armrests, for example, are used as support parts which, due to their inclination adjustability, enable ergonomic adjustability of the furniture on the one hand and changeability of the design on the other hand. A comfortable adjustment can be achieved by means of an electromotive adjusting unit. Such electromotive adjusting units comprise at least one drive unit, which is usually designed in the form of a linear drive and which acts via push rods and/or levers on the support part, which is pivotably connected to a body element, for example a back part, via a pivot fitting. For example, the publication DE 10 2013 200328 A1 shows such an adjusting unit in which a headrest is pivoted by a push drive via a link lever chain.

In these arrangements known from the prior art, there must be sufficient space in the back section to be able to arrange the drive unit in the body element. Furthermore, in addition to as mounting option for pivot fittings, as mounting option for the drive unit must also be provided. This makes it particularly difficult to retrofit an electromotively adjustable support section to an item of seating furniture.

Exemplary embodiments of the present invention are directed to an electromotive adjusting unit for adjusting the inclination of a support part of an item of seating furniture, which is as independent as possible with respect the space available in the body element of an item of seating furniture and which can be retrofitted in a simple manner. Exemplary embodiments are also directed to a support part and an item of seating furniture in which these advantages are obtained.

An electromotive adjusting unit of the type mentioned above has at least one mounting bracket for connection to a body element of the item of seating furniture and a motor and transmission unit as a drive unit comprising a mounting element for fastening the support part of the seating furniture, wherein the motor and transmission unit comprises a rotatable output element that is fastened in a rotationally fixed manner to the at least one mounting bracket.

In the electromotive adjusting unit according to the invention, the motor and transmission unit is thus not arranged in the body element, but in the support part itself. It is connected to the support part and has a rotatable output element, which is then coupled to the body element in a rotationally fixed manner via the mounting bracket. Accordingly, only the at least one mounting bracket, advantageously two mounting brackets, are required with which the support part is fixed to the body element in a manner similar to a manually adjustable support part. Due to the fact that the rotatable output element rotates relative to the motor and transmission unit when the motor is actuated, but this output element is connected to the mounting bracket in a rotationally fixed manner, actuation of the motor of the motor and transmission unit leads to pivoting thereof and thus of the support part relative to the body element.

The body element may be a fixed element of the item of seating furniture, for example a seat frame, or it may be a movable element, such as a back part, with respect to which the support part is adjusted in inclination according to the invention.

In an advantageous design of the electromotive adjusting unit, the output element engages positively in a corresponding receptacle of the mounting bracket. The required torques can be transmitted well and reliably between the output element and the mounting bracket due to the positive locking, for example achieved by means of toothing. The output element can, for example, be provided with an external multi-tooth, which is inserted into an opening with an internal multi-tooth, which is formed on the mounting bracket.

In a further advantageous design of the electromotive adjusting unit, the motor and transmission unit comprises a support bracket having a first leg, on which at least two intermeshing gearwheels are mounted, which form a reduction gear, and a second leg, which is the mounting element. The high torques on the output element required for pivoting the support part can be achieved by means of the reduction gear. By using the support bracket, which simultaneously supports the gearwheels of the reduction gear and provides the mounting element, a simple and material- and cost-saving structure is achieved. Preferably, a bearing plate is arranged parallel to the first leg of the support bracket in which the gearwheels are also supported. The output element is further preferably arranged or formed on one of the gears of the motor and transmission unit. The bearing of this (output) gearwheel then advantageously also represents the pivot bearing of the support part.

In the context of the application, a gearwheel is also to be understood as a gearwheel segment which does not have a full set of teeth, but only over a certain angular range. In particular, the gearwheel on which the output element is arranged or formed may be designed as a gearwheel segment, since the pivoting angle of the output element is usually less than 180° or often even less than 90°.

In a further advantageous design of the electromotive adjusting unit, a transmission unit is provided that is coupled to the motor and transmission unit via a synchronous shaft and which likewise has a rotatable output element that is connected in a rotationally fixed manner to a further mounting bracket. Preferably, the transmission unit also comprises a support bracket having a first leg, on which at least two intermeshing gearwheels are mounted, which form a reduction gear, and a second leg, which also constitutes a mounting element for the support part. Via the transmission unit, on the one hand, a pivot bearing of the support part on a second side and, on the other hand, a synchronous drive of this second side are effected. This design is thus particularly suitable for wider support parts. In the case of narrower support parts, on the other hand, a one-sided drive is also possible only by means of the motor and transmission unit.

Preferably, in a two-sided drive, the reduction gear of the motor and transmission unit and the reduction gear of the transmission unit have the same reduction ratio, wherein the synchronous shaft is connected to an output shaft of a drive motor of the motor and transmission unit. An equal reduction ratio can be achieved in particular by substantially the same structure of both transmission units, so that advantageously as many as possible of the same components (gearwheels, output element, bearing plate, etc.) can be used for the motor and transmission unit and the transmission unit, thereby reducing manufacturing and storage costs.

In a further advantageous design of the electromotive adjusting unit, a power supply for the drive unit is provided via at least one of the mounting brackets. Preferably, at least one of the mounting brackets is hollow at least in sections, wherein a supply cable for the power supply is guided through the mounting bracket. Alternatively, or additionally, at least one of the mounting brackets may comprise a conductive material at least in sections, so that the power supply is provided by the mounting bracket itself.

In both ways, a concealed power supply to the drive unit is achieved. Since the drive units of furniture drives are operated with non-hazardous extra-low voltage, it is not problematic if the mounting brackets themselves are used as conductors. A plug connector may be provided on one or both of the mounting brackets, via which at least one pole of the power supply is guided. In this case, it is provided that the plug connector contacts a corresponding mating plug connector that is plugged in starting from the body element or which is already integrated in the body element, so that when the mounting bracket is plugged in, the electrical contact is also automatically established.

A support part of an item of seating furniture according to the invention comprises such an electromotive adjusting unit, and an item of seating furniture according to the invention comprises at least one such support part. The advantages described in connection with the adjusting unit are obtained. In an advantageous design, the support pad is a head part, also called headrest, of the seating furniture. This can then be pivoted relative to a back part as a body element. Alternatively, the support part can also be an arm support, also called an armrest, which can then be pivoted relative to a side part as a body element. It will be understood that the body element itself may additionally be movable relative to other parts of the seating furniture. For example, a back part can have an inclination adjustment facility and in turn support the pivotable head part via the electromotive adjusting unit.

Preferably, the electromotive adjusting unit is integrated into the support part in such a way that only sections of the at least one mounting bracket protrude from an upholstery. Since all functional elements are thus located within the support part, an existing support part that can only be adjusted manually or not at all can easily be replaced by such an electrically adjustable support part, wherein the body element does not need to be modified or only minimally modified to accommodate power supply lines.

The mounting bracket can assume a wide variety of shapes or consist of a wide variety of raw materials, for example round or rectangular tubes are particularly suitable for this purpose. The mounting bracket is fixed to the body element by suitable connecting means, for example by screwing or by insertion into corresponding receptacles.

BRIEF DESCRIPTION OF THE DRAWING FIGURES

The invention is explained in more detail below with reference to exemplary embodiments with the aid of figures, wherein.

In all figures, identical reference signs indicate identical or similarly acting elements. For reasons of clarity, not every element in all figures is provided with a reference sign.

DETAILED DESCRIPTION

In the description, terms such as top, bottom, left, right refer exclusively to the exemplary representation selected in the respective figures. Only the terms front and rear refer to an orientation of the seating furniture, wherein the front side of the seating furniture is the side facing the user, on which there is also a seating surface for the user.

Figure 1A:
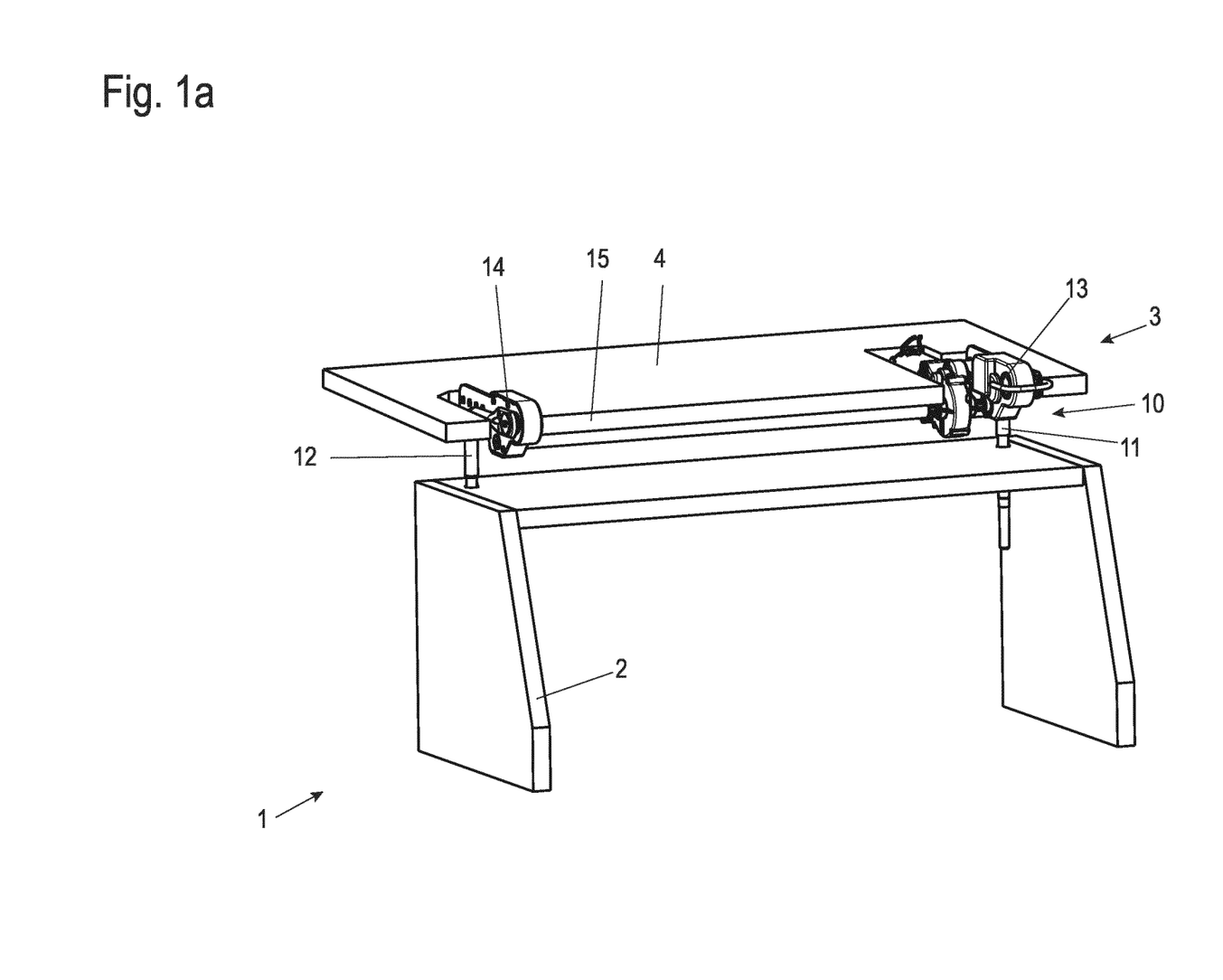
FIG. 1a-c show a section of an item of seating furniture having an adjusting unit in a first adjustment position in different views.
Figure 1B:
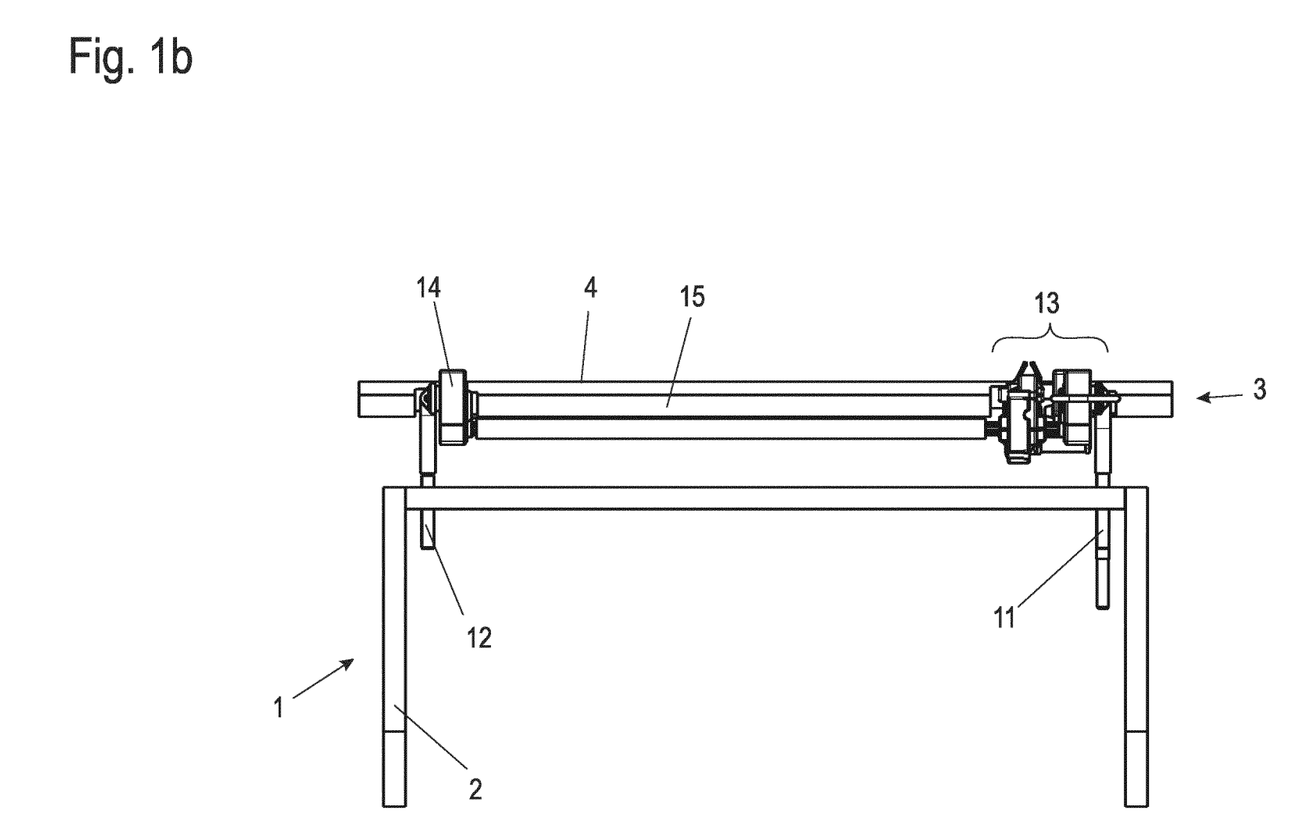
Figure 1C:
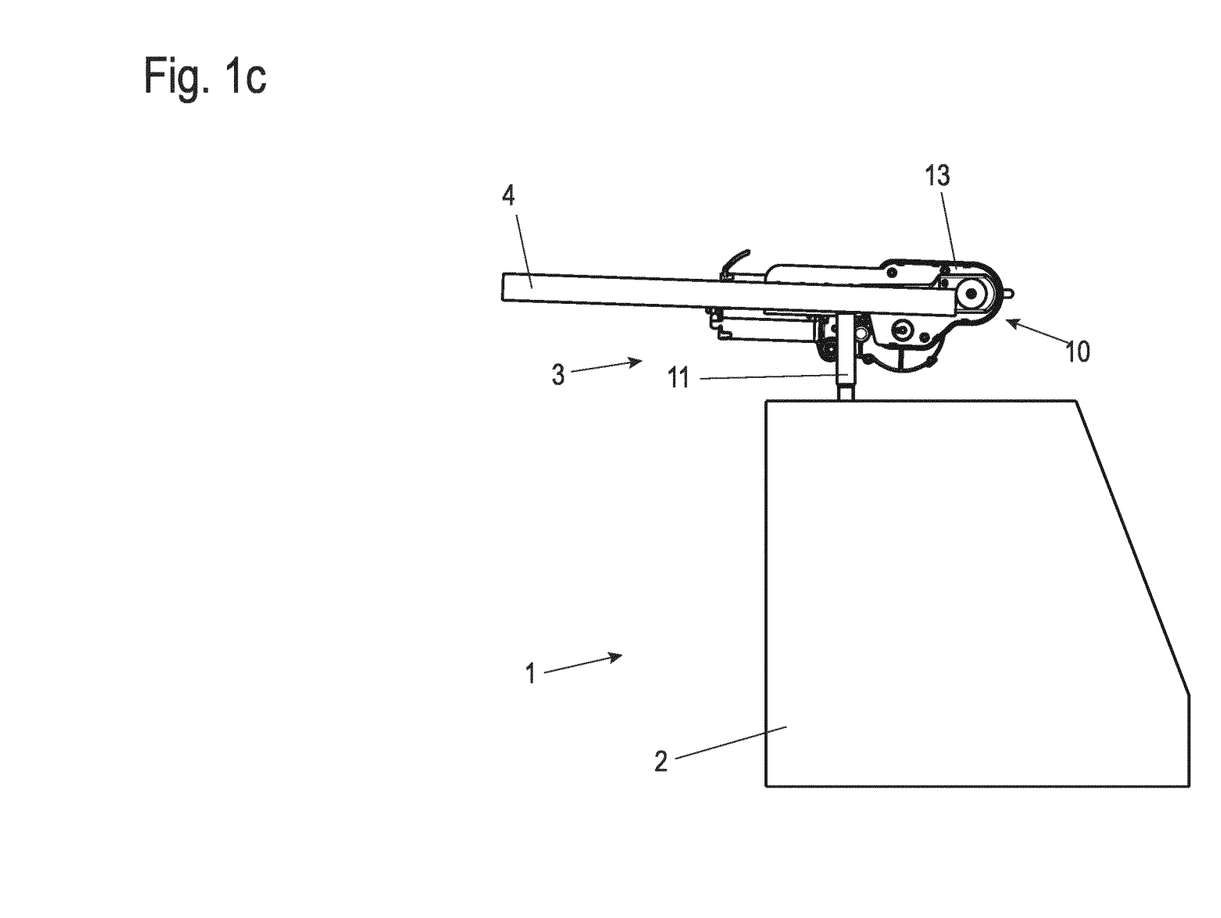

In FIGS. 1a-c, a section of an item of seating furniture 1 with a back part 2 and a head part 3, also referred to as a headrest, which can be pivoted relative to this back part 2, is reproduced in various views. The head part 3 thus represents a pivotable support element of the seating furniture 1, which is mounted on the back part 2 as a body element. FIG. 1a shows the section of the seating furniture 1 in an isometric view from diagonally in front, FIG. 1b shows a front view and FIG. 1c a side view.

In FIGS. 1a-c, the seating furniture 1 is reproduced with a head section that is tapered to the maximum extent towards the rear, i.e., away from the user.

Figure 2A:
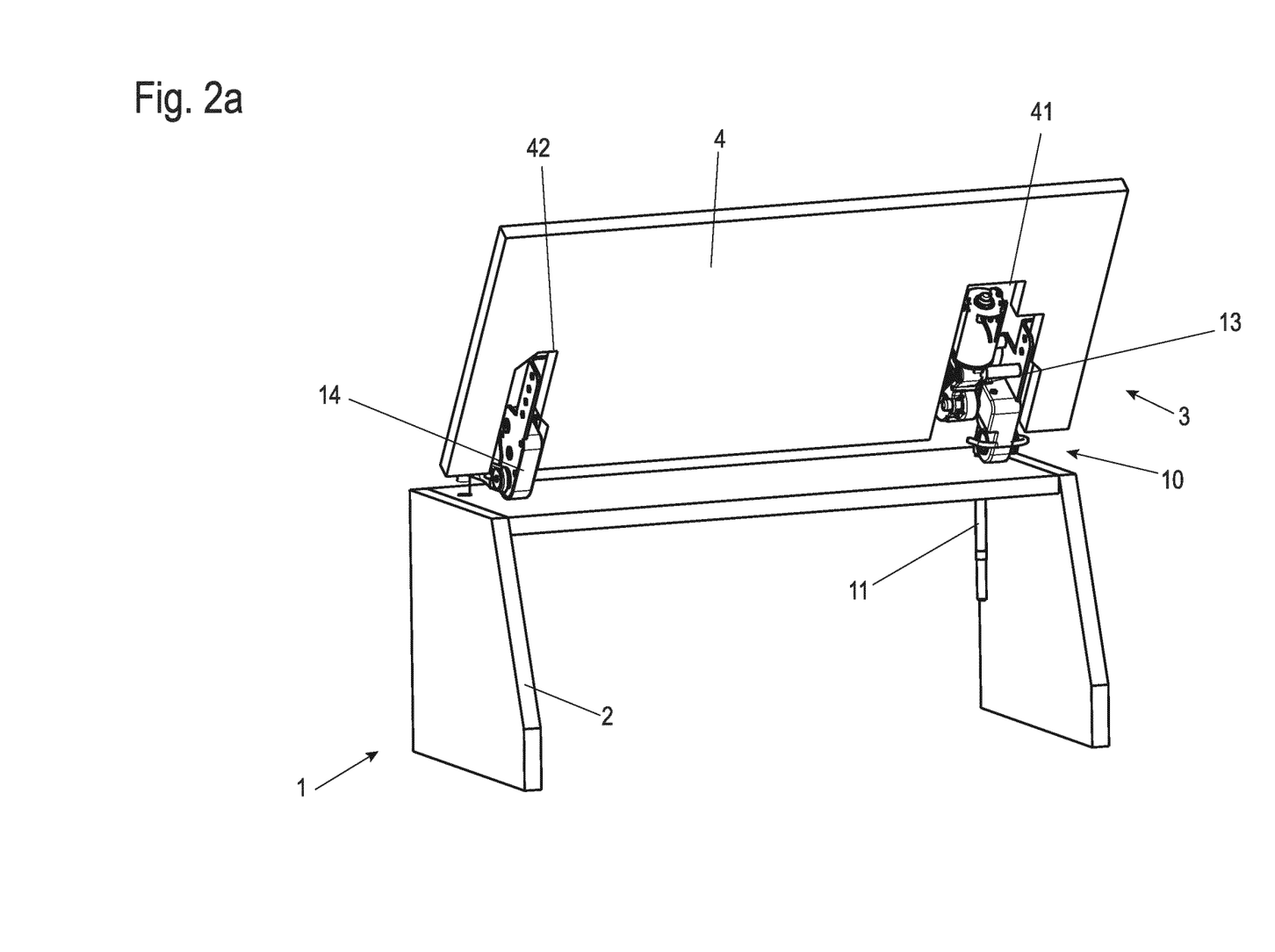
FIGS. 2a-c show the item of seating furniture according to FIGS. 1a-1c in a second adjustment position in different views.
Figure 2B:
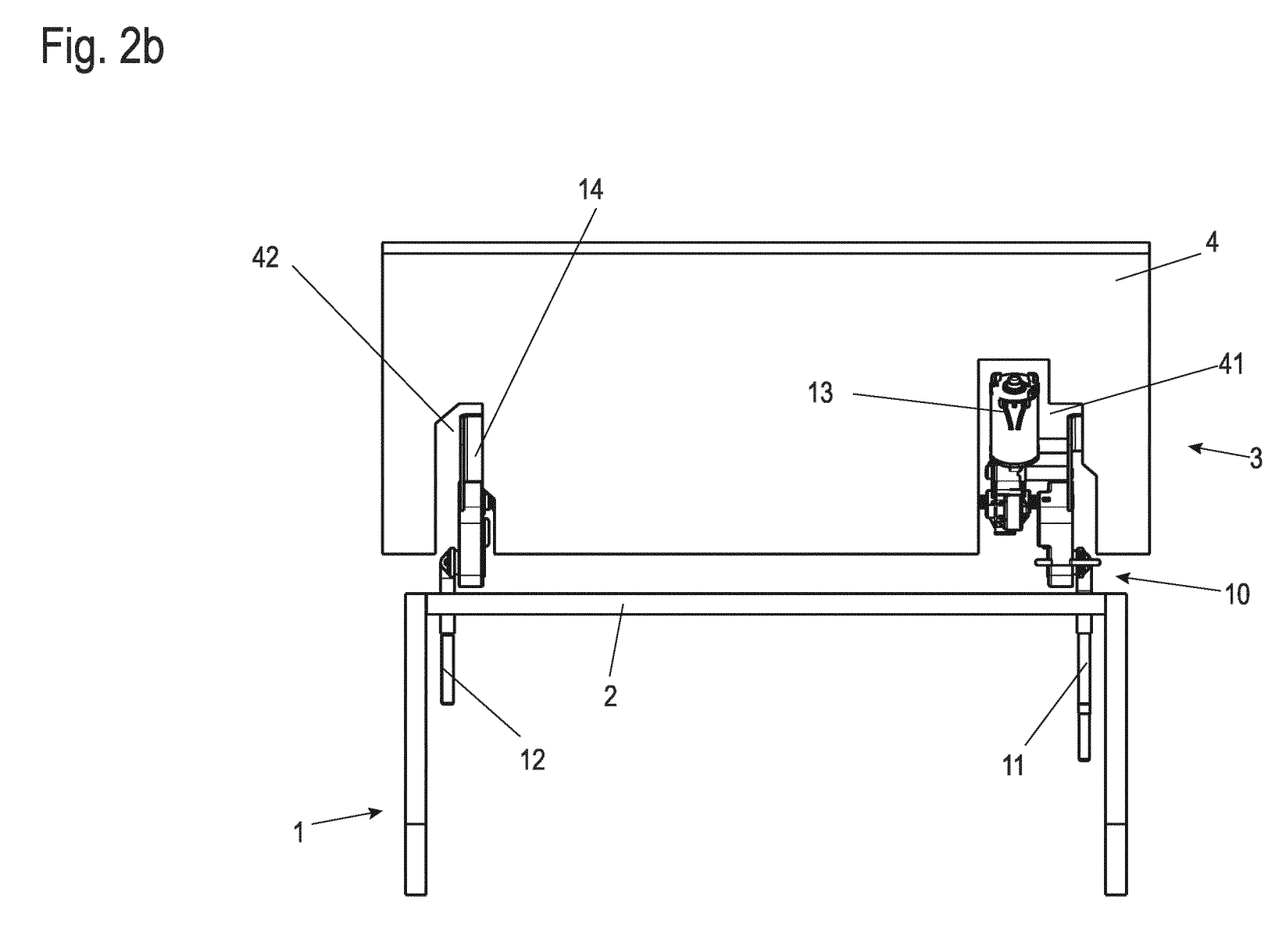
Figure 2C:
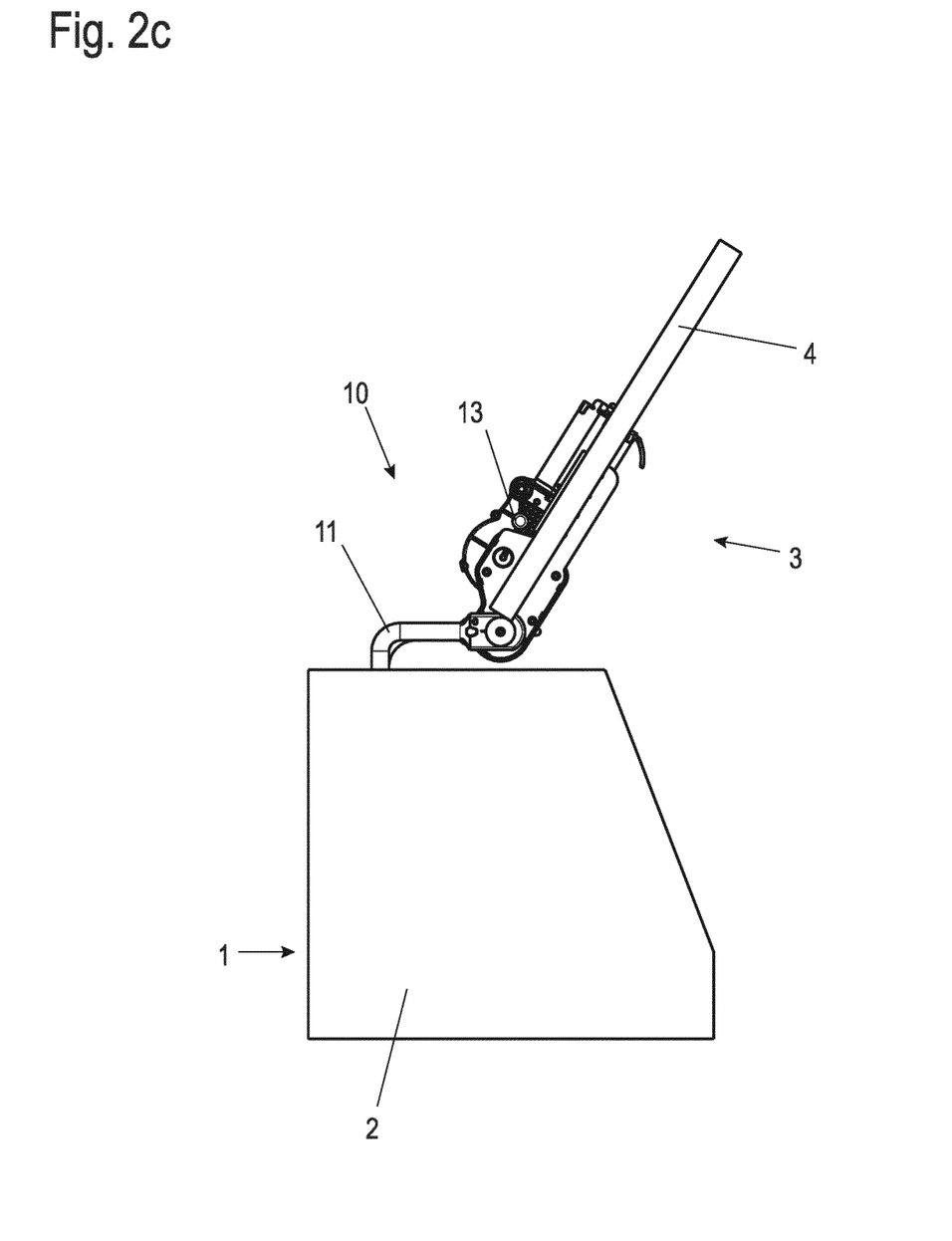

FIGS. 2a-c reproduce the section of the seating furniture 1 in the same way as FIGS. 1a-c, but with the head section 3 being displaced at most towards the front, i.e., towards the user.

The head part 3 is pivoted electromotively via an adjusting unit 10. According to the application, all active components that lead to a movement, in particular a drive unit designed as a motor and transmission unit, are arranged in the head part 3 in the adjusting unit 10. Of the head part 3, only a head part plate 4 is shown by way of example. Also, the hack part 2 is merely reproduced by interconnected plates forming a frame of the seating furniture 1. In the fully manufactured product, both the back part 2 and the head part 3 are provided with upholstery attached to the plates shown of the back part 2 and the head part plate 4, respectively.

The adjusting unit 10 is attached to the hack part 2 by means of mounting brackets 11, 12. For this purpose, insertion openings are provided in the back part 2, into which the mounting brackets 11, 12 can be inserted. In order to achieve increased stability of the fastening of the head part 3 to the back part 2, guide tubes may be incorporated in the back part 2, into which the mounting brackets 11, 12 are inserted. Apart from the inserted mounting brackets 11, 12, no components of the adjusting unit 10 are arranged in the back part 2, which is why, on the one hand, the adjusting unit according to the application can be used even if there is no otherwise required space in the back part 2. On the other hand, the head part 3 with the adjusting unit 10 is well suited for retrofit solutions, since no or only minimal modifications to the back part 2 are necessary.

In addition to their function as supports for the head section 3, the mounting brackets 11, 12 also have a function in the context of an electrical power supply for the adjusting unit 10. In the example shown, the power supply is provided via only one of the mounting brackets, the mounting bracket 11, whereas the other mounting bracket 12 only has a supporting function. Details of the power supply via the holding bracket or brackets 11, 12 will be explained in more detail in connection with FIGS. 5 and 6a-c.

A motor and transmission unit 13 is pivotably connected to the mounting bracket 11 and a transmission unit 14 is pivotably connected to the mounting bracket 12. The motor and transmission unit 13 is coupled to the transmission unit 14 via a synchronous shaft 15 so that both units 13, 14 pivot synchronously during operation. In an alternative design of the adjusting unit, it is also possible to drive only one side of the head part 3 on which the motor and transmission unit 13 is located. Instead of the transmission unit 14, only a (passive) pivot fitting is then arranged on the other side of the head part 3. The synchronous shaft 15 is accordingly not required. This design is particularly suitable for narrow head parts 3.

Figure 3A:
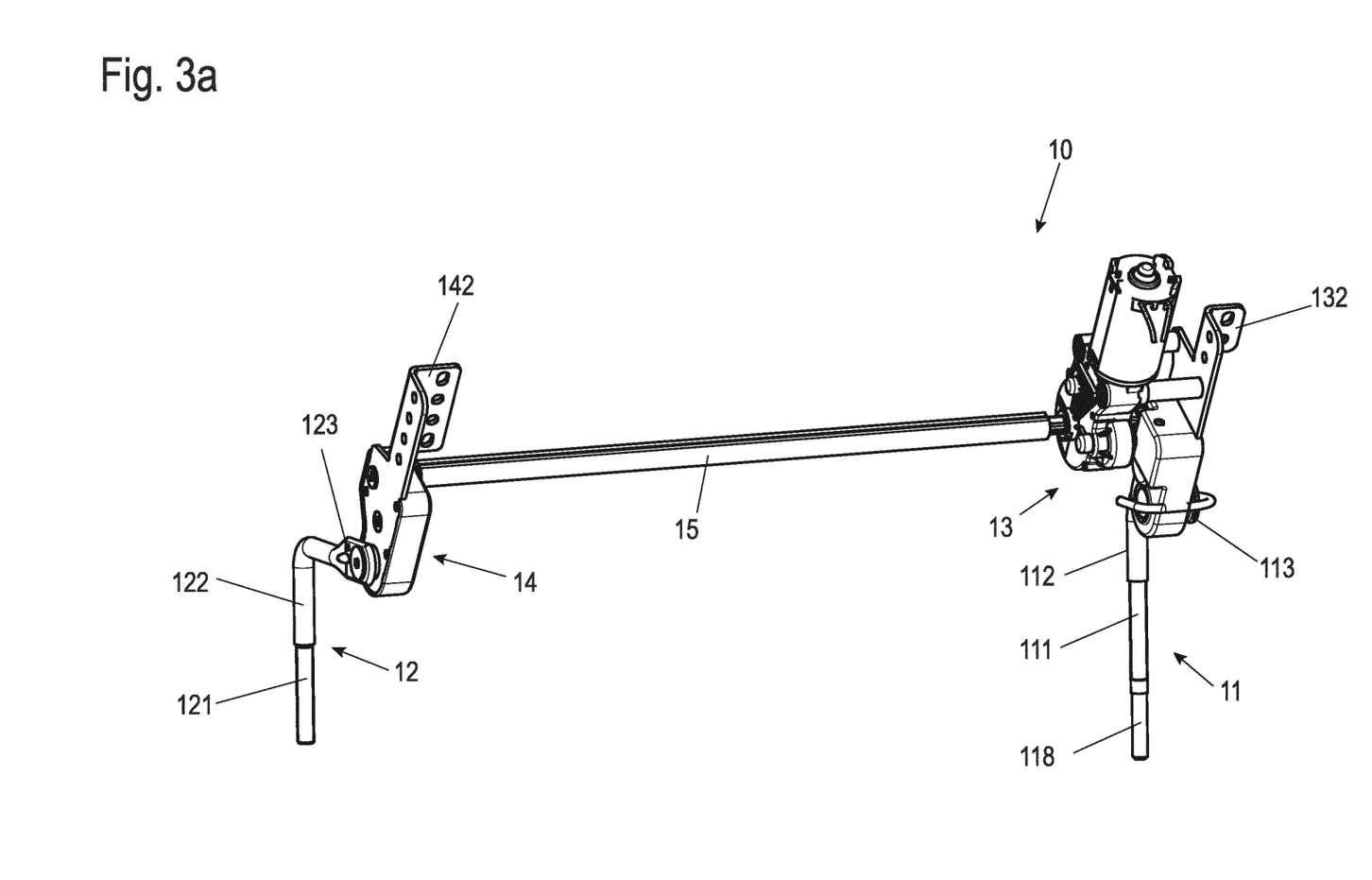
FIGS. 3a-3c show different isometric views of the adjusting unit according to FIGS. 1a-2c in different views.
Figure 3B:
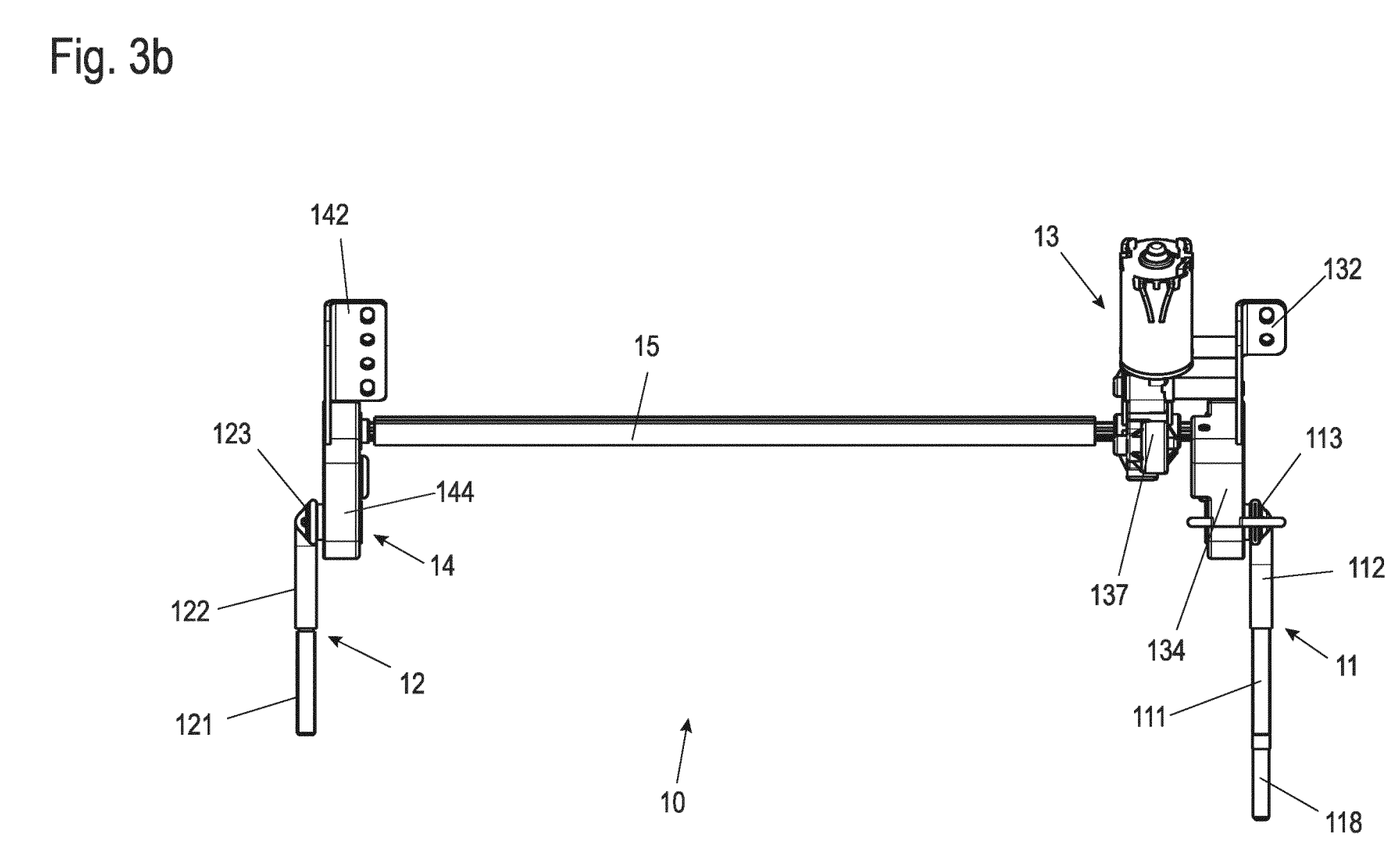
Figure 3C:
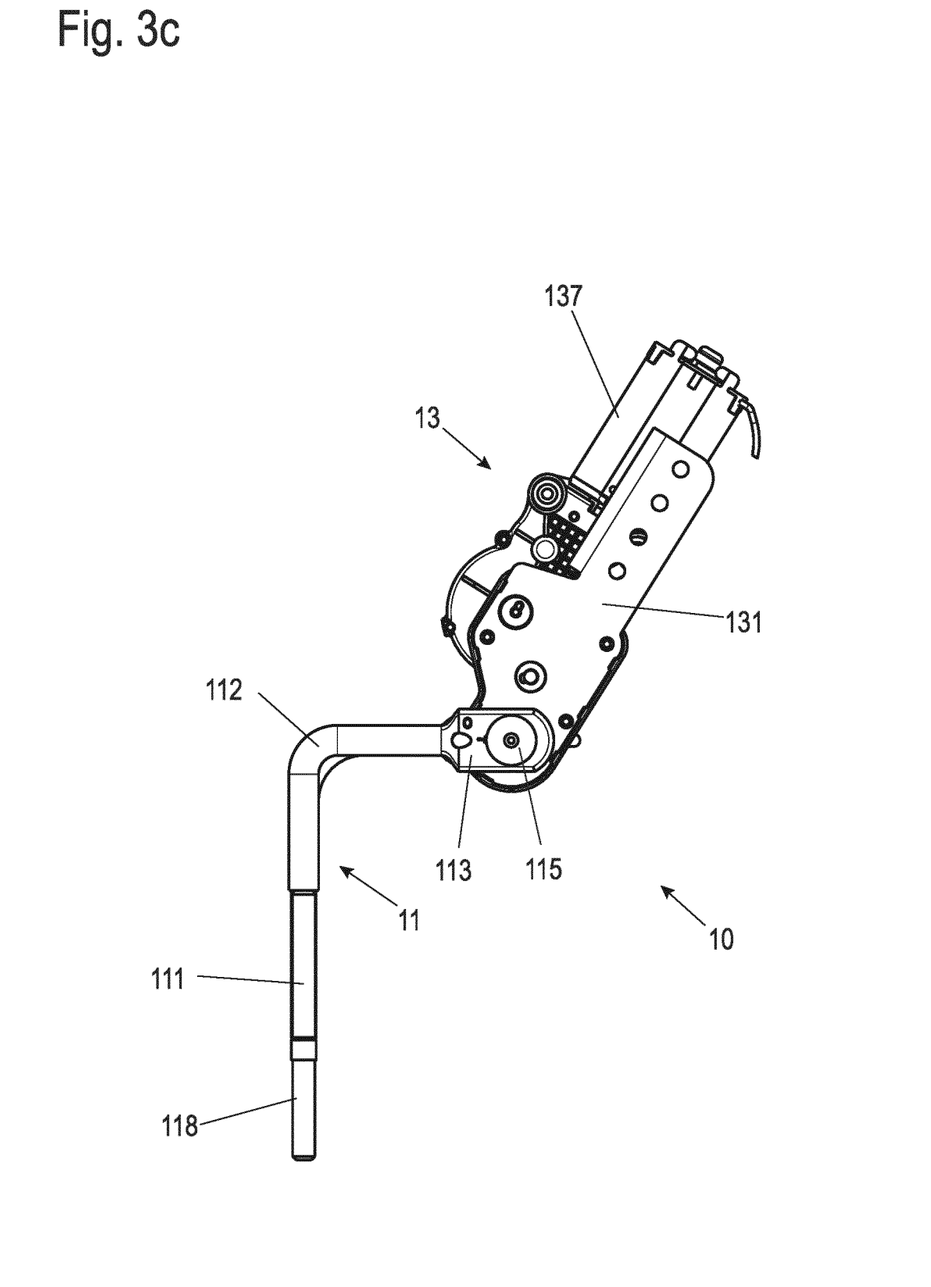
Figure 4:
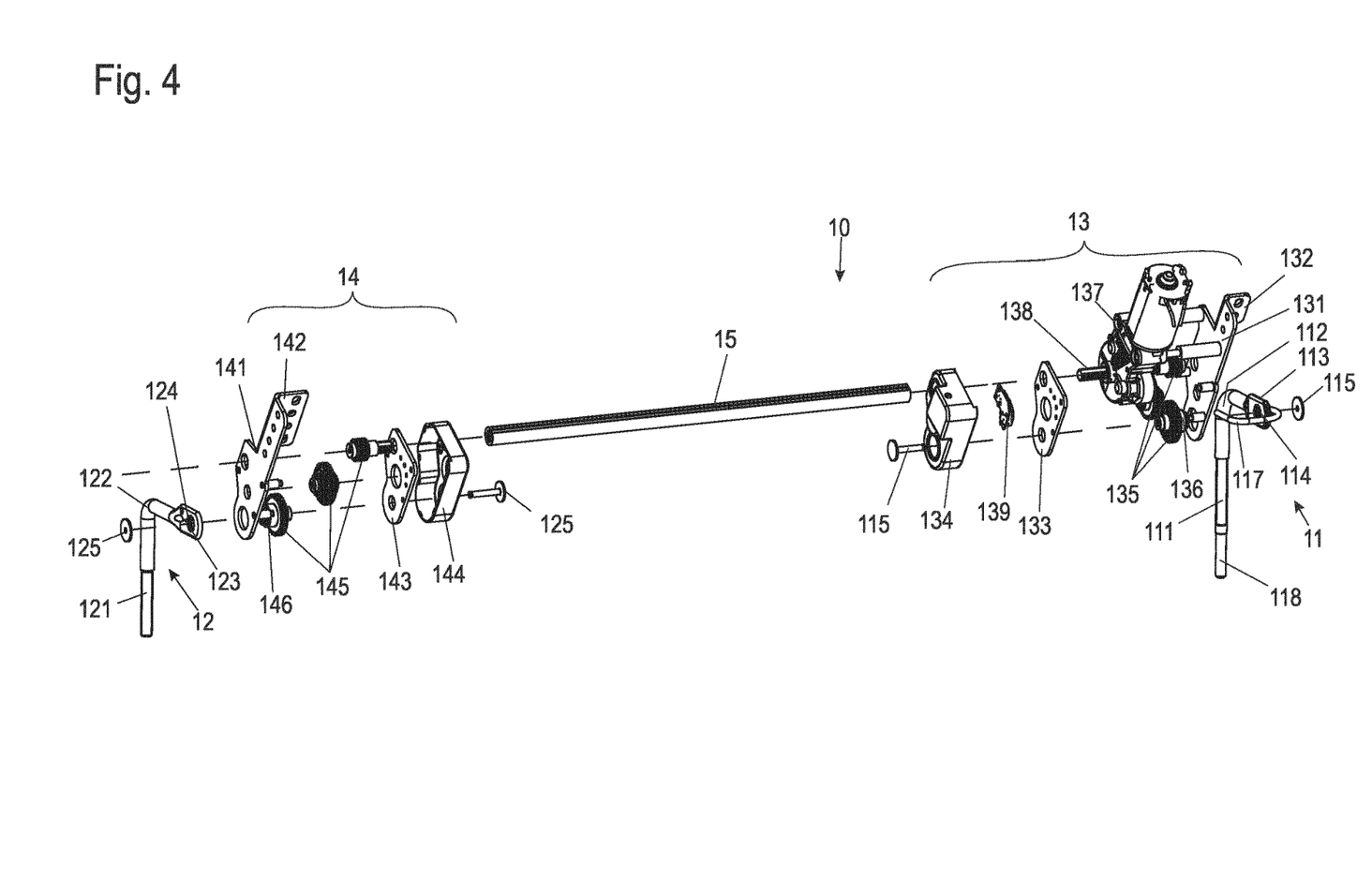
FIG. 4 shows an isometric exploded view of the adjusting unit according to FIGS. 3a-c.

In FIGS. 3a-c, the adjusting unit is shown in the same view and at the same angle of rotation as in FIGS. 2a-c. FIGS. 3a-c thus show the adjusting unit 10 before it is connected to the head part plate 4 or the back part 2. FIG. 4 shows the adjusting unit 10 in an isometric exploded view, wherein the viewing angle and also the adjustment angle correspond to those in FIG. 3a. The structure of the adjusting unit 10 is explained in more detail below with reference to FIGS. 3a-3c and 4.

The motor and transmission unit 13 and the transmission unit 14 of the adjusting unit 10 each have a support bracket 131 and 141, respectively. The support bracket 131, 141 is in each case preferably a sheet metal angle that has been created in a stamping and bending process. One leg in each case serves as a mounting element 132 or 142 to which the head part plate 4 is attached, for example with screws. The motor and transmission unit 13 and the transmission unit 14 are thereby located in the plane or the head part plate 4, which has corresponding recesses 41 and 42. Due to this arrangement of the head part plate 4 in relation to the motor and transmission unit 13 and to the transmission unit 14, the motor and transmission unit 13 and the transmission unit 14 are positioned centrally in the head part 3, which makes them particularly well cushioned from surrounding upholstery.

In addition to bores that serve to fasten the head part plate 4, openings are formed on the support brackets 131, 141 on the other leg for accommodating axle stubs of gearwheels 135 and 145, respectively. The support brackets 131, 141 thus serve to support the gearwheels 135, 145. A bearing plate 133, 143 is provided on an opposite side of each of the gearwheels 135, 145 and has corresponding mirror-image bores for supporting the gearwheels 135, 145 on the side opposite the support bracket 131, 141. The bearing plates 133, 143 are thereby arranged parallel to the support brackets 131, 141 via spacer elements (not further specified in the figures) and are secured to the support brackets 131, 141 via the spacer elements.

One of the respective gearwheels in each case has an output element 136, 146 that emerges outwards through the supporting bracket 131, 141 and is connected in a rotationally fixed manner to the respective mounting bracket 11, 12. For this purpose, an internal multi-tooth 114, 124 is formed in the mounting brackets 11, 12, in which the output element 136, 146 engages. The output element 136, 146 is provided with a suitable toothing. Thus, the output elements 136, 146 and the corresponding gearwheel 135, 145 carrying the output element 136, 146 are connected in a rotationally fixed manner to the mounting brackets 11, 12. In each case, a combination of rivet and washer 115, 125 is provided that connects the output element 136, 146 or the associated gearwheel 135, 145 to the respective mounting bracket 11, 12 also in the axial direction. The output element 136, 146 and the associated gearwheel 135, 145 are provided with a through axial bore for the purpose. Instead of the combination of rivet and washer 115, 125, a combination of bolt and (secured or self-locking) nut may also be used.

Accordingly, a rotation of the output element 136, 146 relative to the support brackets 131, 141 leads to a pivoting of the support brackets 131, 141 and thus of the head part plate 4 or of the head section 3.

The gearwheels 135 and 145 shown each form a reduction gear to provide the high torques required to pivot the head section 3 at the output element 136, 146. A housing shell 134, 144 serves to cover each of the gears thus formed.

In the example shown, the transmission has a three-stage structure, with a drive gearwheel, an intermediate gearwheel, and the aforementioned output gearwheel, which is coupled to the output element 136, 146 or is manufactured integrally therewith. The drive gearwheels are driven by a drive motor, which in turn is formed as a gear motor 137 in the present example. The transmission of the gear motor 137 may, for example, be a worm gear, wherein a worm is arranged on an electric motor and acts on a worm wheel mounted on an output shaft 138. In this case, the worm gear of the gear motor 137 may be designed to be self-locking so that the head part 3 does not pivot when the gear motor 137 is not energized, even when external force is applied. A design may also be chosen that is self-locking when a moderate amount of force is applied during proper use, but which causes the head section 3 to pivot when excessive external forces are applied. This counteracts damage to the adjusting unit 10 or its attachment to the back part 2 or the head part 3.

The output shaft 138 protrudes from both sides of the gear motor 137. On one side, the output shaft 138 is directly coupled to the drive gearwheel of the gearwheels 135 of the motor and transmission unit 13. The opposite part of the output shaft 138 is initially coupled in a rotationally fixed manner to the synchronous shaft 15, wherein the latter drives in a rotationally fixed manner the drive gearwheel of the gearwheels 135 of the transmission unit 14. In this way, it is ensured that both support brackets 131, 141 move synchronously when the gear motor 137 is actuated. Advantageously, identical gearwheels 135, 145 are used in pairs for this purpose in the motor and transmission unit 13 on the one hand and the transmission unit 14 on the other hand.

A limit switch plate 139 is also arranged in the motor and transmission unit 13, which has limit switches that are actuated when the support bracket 131 reaches one of the two end positions also shown in FIGS. 1a-c and 2a-c, respectively. For actuating the limit switches of the limit switch plate 139, cams may be arranged on one of the gearwheels 135 at suitable positions.

Figure 5:
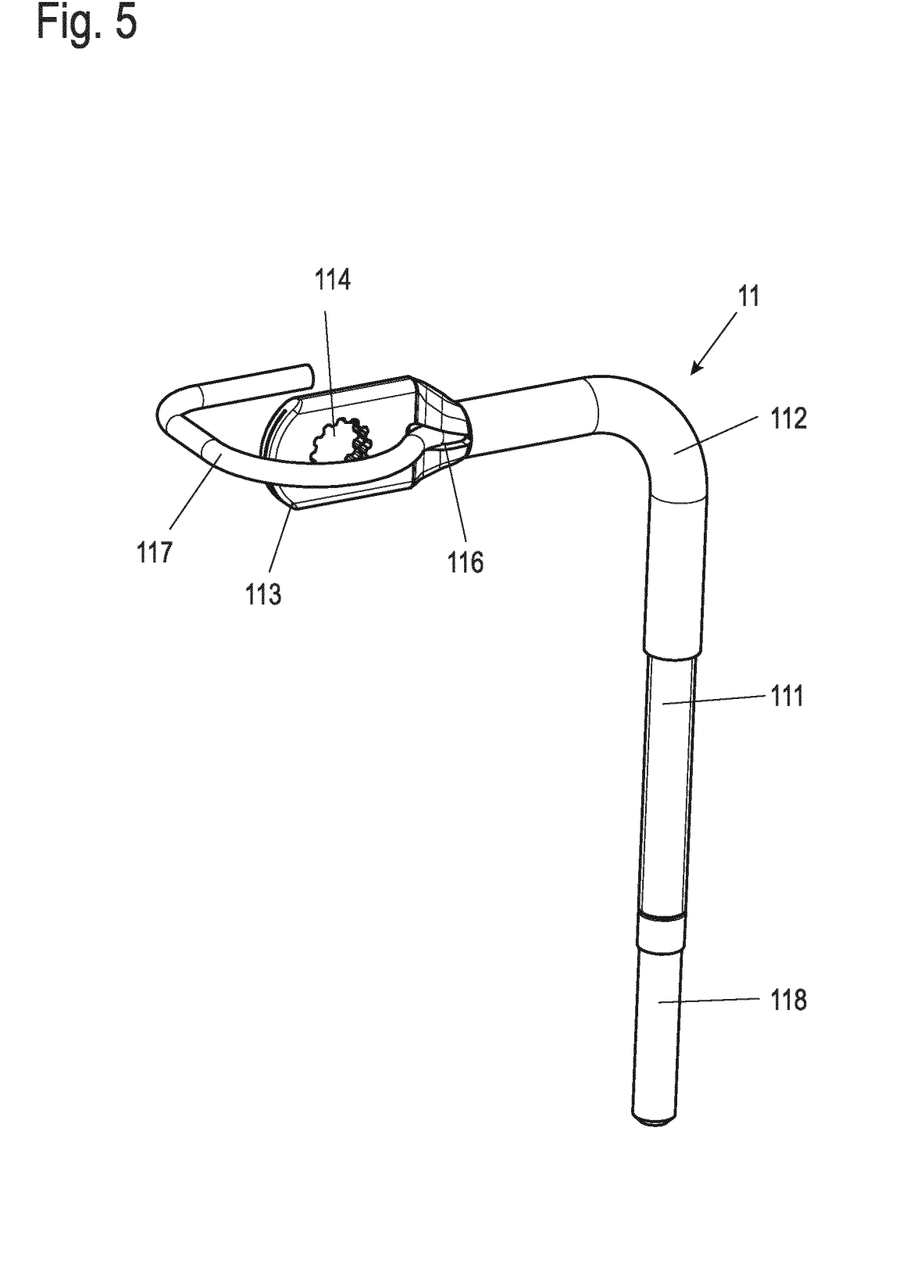
FIG. 5 shows an enlarged isometric view of the mounting bracket according to FIG. 4.

In FIG. 5, the mounting bracket 11 of the adjusting unit 10 shown in FIG. 4 is reproduced in enlarged form. As previously described, the mounting bracket 11 (as well as the mounting bracket 12) is inserted into a corresponding receptacle of the back part 2. For this purpose, the mounting bracket 11 has plug-in section 111 that has a slightly smaller diameter than the following support section 112, which is angled in the example shown. However, depending on the geometry of the head part 3 or the back part 2 and depending on the position of the receptacles for the mounting brackets 11, 12, a particularly straight or only slightly angled design of the support section 112 can also be selected here. At the free end of the support section 112, a support tab 113 is formed in which the internal multi-tooth 114 already described is formed. The shown mounting bracket 11 can be manufactured in one piece entirely from tubular material in a stamping and bending process.

As also described above, the power supply for the gear motor 137 of the adjusting unit 10 is provided via the mounting bracket 11. For this purpose, a supply cable 117 is guided through the mounting bracket 11. In the transition area between the support section 112 and the support tab 113, an opening 116 is made through which the supply cable 117 coming from the gear motor 137 or the limit switch plate 139 is inserted into the support section 112.

In the illustrated exemplary embodiment, a plug connector 118 is arranged at the opposite end of the plug-in section 111, which is connected to the supply cable 117. The plug connector 118 contacts a corresponding mating connector that is plugged in starting from the back part 2 or which is already integrated in the back part 2, so that when the mounting bracket 11 is plugged in, the plug connector 118 automatically contacts the mating plug connector directly.

In this regard, the plug connector 118 may be designed with multiple poles, so that the two at least required poles for supplying the gear motor 137 are contacted via the plug connector 118. In an alternative design, the plug connector 118 may also be of single-pole design, in which case the at least one other required pole is routed via the plug-in section 111. When the mounting bracket 11 is manufactured from a metal tube by a stamping and bending process, the plug-in section 111 is also made of metal and conductive so that it can serve as a conductor. Since the gear motor 137 is a low-voltage motor supplied with non-hazardous extra-low voltage, it is unproblematic that the entire mounting bracket 11 is thus at a potential which is also present at the gear motor 137.

In the previously described exemplary embodiment of the adjusting unit 10, the supply cable 117 is completely routed in the one mounting bracket 11. The second mounting bracket 12 has no electrical functionality, but is otherwise of the same construction. However, it also has a plug-in section 121, a support section 122, and a support tab 123 in which the internal multi-tooth 124 is formed (cf. FIG. 4).

In an alternative design of the adjusting unit 10, it may also be provided that each of the mounting brackets 11, 12 performs a function in the electrical power supply. In particular, it may be provided that each of the mounting brackets 11, 12 is used as a conductor via which one pole of the at least two poles required to supply the gear motor 137 is guided. A voltage difference that is then present between the mounting brackets 11, 12 during operation of the gear motor 137 is also safe in this case, since the gear motor 137 is only supplied with low voltage.

Figure 6A:
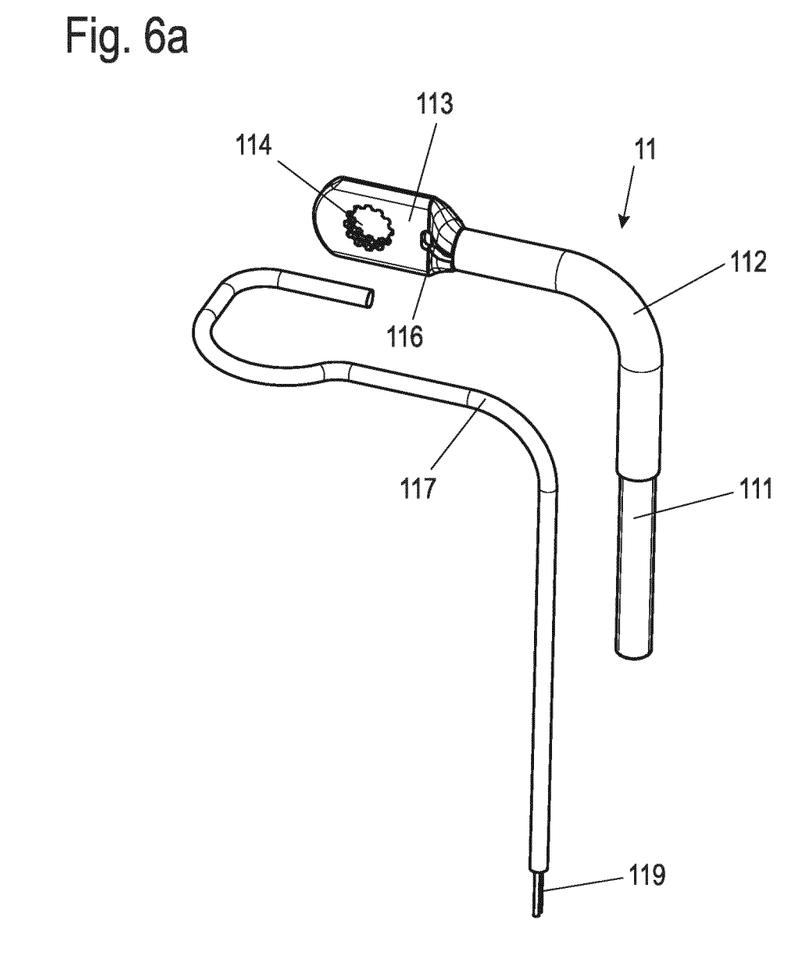
FIGS. 6a-c show different views of an alternative design of the mounting bracket according to FIG. 5.
Figure 6B:
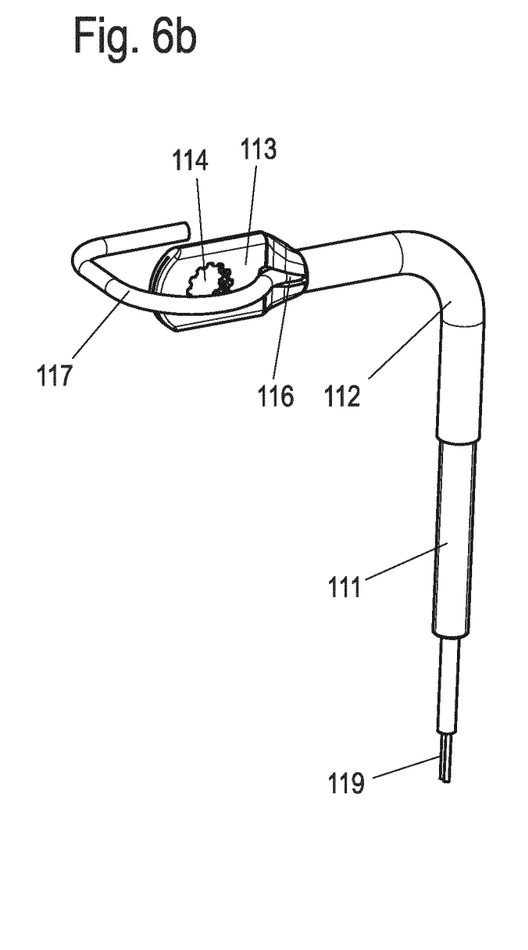
Figure 6C:
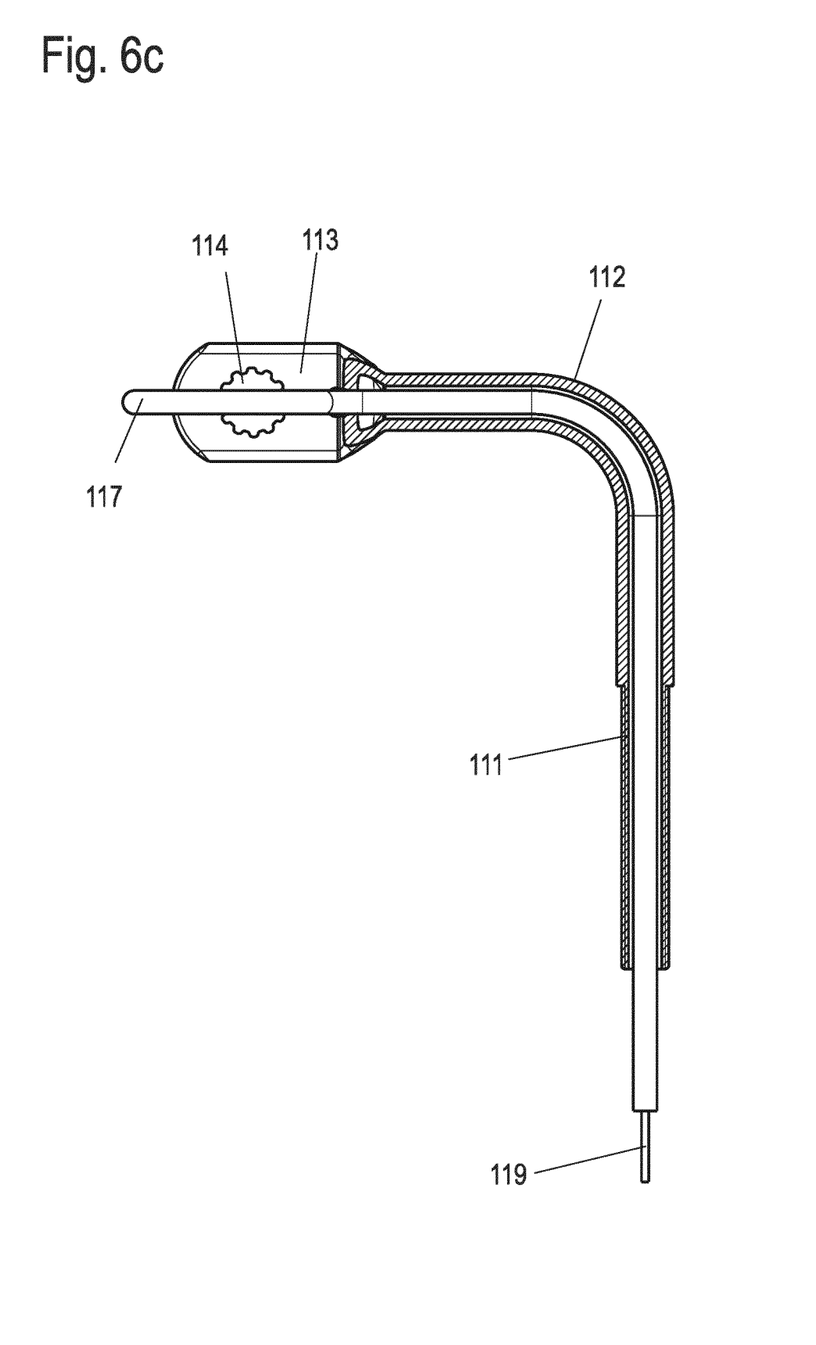

FIGS. 6*a-c* show a second exemplary embodiment of a mounting bracket 11 with a supply cable function. FIG. 6*a* shows the mounting bracket 11 and the supply cable 117 to be inserted therein in isometric; representations separately from each other. In FIGS. 6*b* and 6*c*, the supply cable 117 is inserted into the mounting bracket 11. FIG. 6*b* shows the mounting bracket 11 again in an isometric representation, whereas FIG. 6*c* shows the mounting bracket 11 in a sectional representation.

With respect to the mechanical structure of the mounting bracket 11 in this exemplary embodiment, reference is made to FIG. 5 and the embodiment previously described.

What is different at the mounting bracket 11 of FIGS. 6*a-c* is that there is no plug connector 118 integrally formed with the mounting bracket 11 adjoining the plug-in section 111, but that the supply cable 117 leaves the tubular plug-in section 111 in a downward direction and ends, for example, in a cable end 119 which can then be contacted by suitable terminals. The supply cable 117 can of course also be of correspondingly longer design, so that it is guided through the seating furniture 1 without intermediate contacting and extends to a power supply or control device which is not shown here.

In the exemplary embodiments, the adjusting unit 10 is shown by way of example in connection with the head part 3, which is pivotable relative to the back part 2. The adjusting unit 10 can likewise be used for adjusting another support part of an item of seating furniture, for example an armrest. In that case, a side part of the seating furniture is the body element with respect to which the armrest is pivoted.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Seating furniture
2 Back part
3 Head part
4 Head part plate
41, 42 Recess
10 Adjusting unit
11 Mounting bracket (with supply cable)
12 Mounting bracket (without supply cable)
13 Motor and transmission unit
14 Transmission unit
15 Synchronous shaft
111, 121 Plug-in section
112, 122 Support section
113, 123 Support tab
114, 124 Internal multi-tooth
115, 125 Rivet and washer
116 Opening
117 Supply cable
118 Plug connector
119 Cable end
131, 141 Support bracket
132, 142 Mounting element
133, 143 Bearing plate
134, 144 Housing shell
135, 145 Gearwheel
136, 146 Output element
137 Gear motor
138 Output shaft
139 Limit switch plate

The invention claimed is:

1. An electromotive adjusting unit configured to adjust an inclination of a support part of an item of seating furniture, the electromotive adjusting unit comprising:

at least one mounting bracket configured to connect to a body element of the item of seating furniture;

a motor and transmission unit embodied as a drive unit, wherein the motor and transmission unit comprises a rotatable output element fastened in a rotationally fixed manner to the at least one mounting bracket; and a mounting element configured to fasten the support part of the piece of seating furniture, wherein the motor and transmission unit comprises a support bracket having a first leg on which at least two intermeshing gears forming a reduction gear are mounted, and a second leg constituting the mounting element.

2. The electromotive adjusting unit of claim 1, wherein the rotatable output element engages positively in a corresponding receptacle of the at least one mounting bracket.

3. The electromotive adjusting unit of claim 1, further Comprising:

a bearing plate arranged parallel to the first leg of the support bracket, wherein the at least two intermeshing gears are mounted in the bearing plate.

4. The electromotive adjusting unit of claim 1, wherein the rotatable output element is arranged or formed on one of the at least two intermeshing gears of the motor and transmission unit.

5. The electromotive adjusting unit of claim 1, further comprising:

a transmission unit coupled to the motor and transmission unit via a synchronous shaft; and a rotatable output element fastened in a rotationally fixed manner to a further mounting bracket.

6. The electromotive adjusting unit of claim 5, wherein the transmission unit comprises a further support bracket having a further first leg on which at least two further intermeshing gearwheels forming a further reduction gear are mounted, and a second leg that constitutes a further mounting element for the support part.

7. The electromotive adjusting unit of claim 6, wherein the reduction gear of the motor and transmission unit and the further reduction gear of the transmission unit have a same reduction ratio, and the synchronous shaft is connected to an output shaft of a drive motor of the motor and transmission unit.

8. The electromotive adjusting unit of claim 1, wherein the at least one mounting bracket comprises at least a first and second mounting bracket, wherein a power supply for the drive unit is provided via at least one of the first and second mounting brackets.

9. The electromotive adjusting unit of claim 8, wherein at least one of the first and second mounting brackets is hollow at least in sections, wherein a supply cable for the power supply is guided through the at least one of the first and second mounting brackets.

10. The electromotive adjusting unit of claim 8, wherein at least one of the first and second mounting brackets consists, at least in sections, of a conductive material, so that the power supply is provided by the at least one of the first and second mounting brackets.

11. The electromotive adjusting unit of claim 8, wherein at least one of the first and second mounting brackets has a plug contact via which at least one pole of the power supply is guided.

12. A support part of an item of seating furniture, comprising:

a plate; and an electromotive adjusting unit coupled to the plate, wherein the electromotive adjusting unit comprises at least one mounting bracket configured to connect to a body element of the item of seating furniture;

a motor and transmission unit embodied as a drive unit, wherein the motor and transmission unit comprises a rotatable output element fastened in a rotationally fixed manner to the at least one mounting bracket; and a mounting element configured to fasten the plate, wherein the motor and transmission unit comprises a support bracket having a first leg on which at least two intermeshing gears forming a reduction gear are mounted, and a second leg constituting the mounting element.

13. The support part of claim 12, further comprising:

upholstery surrounding the plate, wherein the electromotive adjusting unit is integrated in the support part such that only sections of the at least one mounting bracket protrude from the upholstery.

14. The support part of claim 12, wherein the support part is a head part of the item of seating furniture and is pivotable with respect to a back part of the item of seating furniture.

15. An item of seating furniture, comprising:

a body element; and a support part comprising a plate and an electromotive adjusting unit coupled to the plate, wherein the support part is coupled to the body element by the electromotive adjusting unit, wherein the electromotive adjusting unit comprises at least one mounting bracket configured to connect to a body element of the item of seating furniture;

a motor and transmission unit embodied as a drive unit, wherein the motor and transmission unit comprises a rotatable output element fastened in a rotationally fixed manner to the at least one mounting bracket; and a mounting element configured to fasten the plate, wherein the motor and transmission unit comprises a support bracket having a first leg on which at least two intermeshing gears forming a reduction gear are mounted, and a second leg constituting the mounting element.

* * * * *